Aug. 3, 1948.
G. E. DATH
2,446,215
RAILWAY DRAFT GEAR FRICTION
SHOCK ABSORBING MECHANISM
Filed Feb. 10, 1945
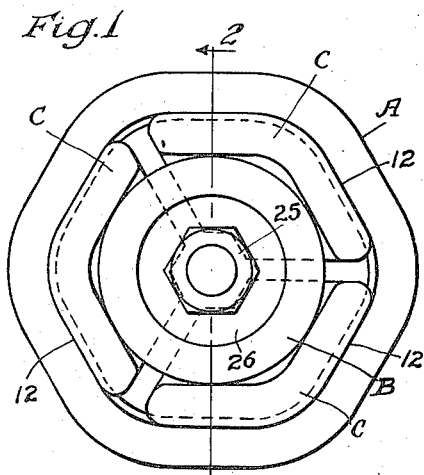
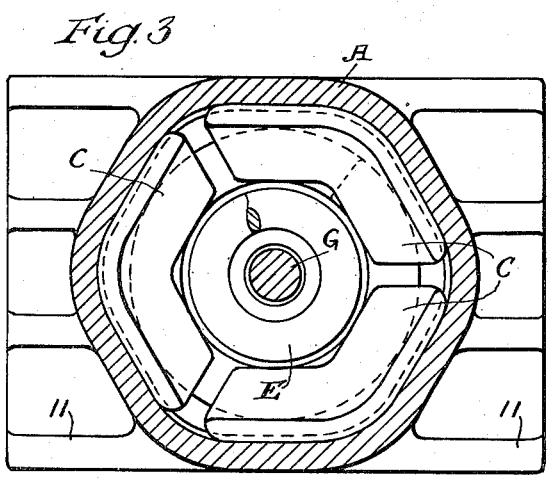
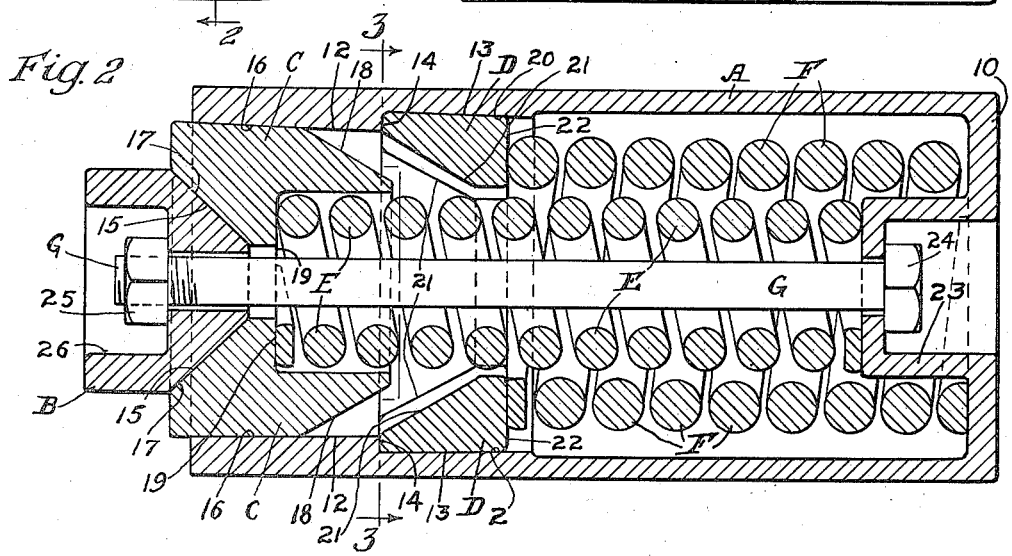
Inventor
George E. Dath
By Henry Fuchs
Atty.

Patented Aug. 3, 1948

2,446,215

UNITED STATES PATENT OFFICE 2,446,215

RAILWAY DRAFT GEAR FRICTION SHOCK ABSORBING MECHANISM

George E. Dath, Mokena, Ill., assignor to W. H. Miner, Inc., Chicago, Ill., a corporation of Delaware Application February 10, 1945, Serial No. 577,294

19 Claims. (Cl. 213—34)

This invention relates to improvements in railway draft gear friction shock absorbing mechanisms especially adapted for railway draft riggings.

One object of the invention is to provide a friction shock absorbing mechanism having relatively light frictional resistance during the first part of the compression stroke to absorb the lighter shocks to which the mechanism is subjected, followed by higher frictional resistance to absorb heavier shocks.

A further object of the invention is to provide a friction shock absorbing mechanism of the character set forth in the preceding paragraph including a friction column having two sets of spring resisted friction shoes cooperating therewith and a pressure transmitting wedge member having wedging engagement with one of said sets of shoes to force the same into tight frictional engagement with, and slide the same lengthwise of, said column element to provide relatively light frictional resistance, wherein the two sets of shoes have wedging engagement with each other after a predetermined compression has been effected to force the second set of shoes into tight frictional contact with, and slide the same lengthwise of, the column, thereby combining the frictional resistance provided by both sets of shoes to produce relatively high frictional resistance during the latter part of the compression stroke of the mechanism.

A more specific object of the invention is to provide a friction shock absorbing mechanism comprising a friction casing having interior friction surfaces; front and rear sets of friction shoes engaging the friction surfaces; a wedge block having wedging engagement with the front set of shoes for forcing the same into tight frictional contact with the casing friction surfaces throughout the compression stroke; independently acting springs respectively opposing movement of the two sets of shoes inwardly of the casing; means for limiting outward movement of the front set of shoes; and means for limiting outward movement of the rear set of shoes to normally hold the same spaced inwardly from the front set of shoes, wherein the shoes have cooperating wedge faces which are brought into engagement with each other after predetermined partial compression of the mechanism to force the rear set of shoes into tight frictional engagement with the casing and move the same inwardly after the mechanism has been compressed to said predetermined partial extent to increase the frictional resistance during the remainder of the compression stroke by adding the frictional resistance provided by the rear set of shoes to the resistance offered by the front set.

Other objects of the invention will more clearly appear from the description and claims hereinafter following.

In the drawing forming a part of this specification, Figure 1 is a front elevational view of my improved friction shock absorbing mechanism. Figure 2 is a longitudinal, vertical sectional view, corresponding substantially to the line 2—2 of Figure 1. Figure 3 is a transverse, vertical sectional view, corresponding substantially to the line 3—3 of Figure 2.

As shown in the drawing, my improved friction shock absorbing mechanism comprises broadly a friction casing A; a wedge block B; a front set of three friction shoes C—C—C; a rear set of three friction shoes D—D—D; a spring resistance E cooperating with the front set of shoes; a second spring resistance F cooperating with the rear set of shoes; and a retainer bolt G for holding the mechanism assembled.

The casing A is in the form of a tubular casting of hexagonal, transverse, interior and exterior cross section. The casing A is closed at its rear end by a transverse, vertical wall 10. The wall 10 is extended laterally outwardly at opposite sides of the casing, thereby providing flanges 11—11 which form an integral rear follower on the casing. At the forward end, the casing A is provided with two sets of interior friction surfaces, that is, a front and a rear set. The front set comprises three friction surfaces 12—12—12, which extend lengthwise of the mechanism and converge inwardly. Each friction surface 12 is of V-shaped, transverse cross section, the two converging portions of each V-shaped surface being formed by adjacent inner faces of the hexagonal casing. The rear set comprises three friction surfaces 13—13—13, which extend lengthwise of the casing and converge inwardly. Each friction surface 13 is also of V-shaped, transverse cross section and is formed by two adjacent inner faces of the hexagonal casing. The rear friction surfaces 13 are offset laterally outwardly at their forward ends with respect to the front friction surfaces 12, thereby providing shoulders 14—14—14 between the two sets of surfaces.

The wedge B is in the form of a block having three inwardly and rearwardly converging wedge faces 15—15—15 at the inner end thereof. The wedge faces 15 are in the form of flat surfaces and engage with the front set of friction shoes C—C—C.

The front set of friction shoes C are three in number, each shoe having a longitudinally extending friction surface 16 on the outer side thereof which is of V-shaped, transverse cross section and engages the corresponding V-shaped friction surface 12 of the front set. Each shoe C is laterally inwardly enlarged at the front end and said enlarged portion is provided with an inner flat wedge face 17 which is engaged by the corresponding flat wedge face 15 of the block B. At the rear end, each shoe C has a V-shaped wedge face 18, which is inclined lengthwise inwardly toward the central longitudinal axis of the mechanism at an angle which is keener than the angularity of the face 17 of said shoe and the cooperating face 15 of the wedge with respect to said axis. In the assembled condition of the mechanism, the three wedge faces 18—18—18 of the front set of shoes are disposed symmetrically about the central longitudinal axis of the mechanism. The enlargement of each shoe C provides a flat end face 19 which serves as an abutment or seat for the front end of the spring E.

The set of rear friction shoes D comprises three members, the shoes of this set being arranged in longitudinal alignment with the shoes C—C—C of the front set. Each friction shoe D has a V-shaped friction surface 20 on the outer side thereof slidably engaging the corresponding V-shaped friction surface 13 of the casing. At the forward end, each shoe D is provided with a V-shaped wedge face 21 on the inner side thereof correspondingly inclined to, and adapted to be engaged by, the V-shaped wedge face 18 of the front shoe C, which is in longitudinal alignment therewith. At the rear end thereof, each shoe C has a flat transverse face 22 forming a seat for the front end of the outer spring F.

The spring F is in the form of a helical coil, which surrounds the spring E, and has its front and rear ends bearing respectively on the end faces 22 of the shoes D and the transverse rear end wall 10 of the casing. A central hollow boss 23, which projects inwardly from the rear wall 10 of the casing, is provided to center the rear end of the spring F.

The spring E, which is lighter than the spring F, is also in the form of a helical coil and has its front and rear ends bearing respectively on the abutment faces 19 of the shoes C and the front end of the hollow boss 23 of the casing A.

The retainer bolt G has a head 24 at the rear end thereof, the same being seated within the boss 23, thereby anchoring the bolt to the same. At the forward end, a nut 25 is provided on the bolt G, which is seated in a pocket 26 provided in the wedge block B. The bolt G limits outward movement of the wedge B and holds the mechanism assembled with the spring E preferably under predetermined initial compression.

As will be evident upon reference to Figure 2, the friction shoes D—D—D abut the shoulders 14—14—14 of the casing, thereby limiting outward movement of the shoes and holding the same in position with the wedge faces 21—21—21 thereof spaced inwardly from the wedge faces 18—18—18 of the shoes C—C—C, in the normal full release position of the parts.

The operation of my improved friction shock absorbing mechanism is as follows: Upon compression of the mechanism in operation of the railway draft rigging, the wedge B is forced inwardly of the casing, thereby setting up a wedging action between the same and the shoes C—C—C, forcing the latter into tight frictional engagement with the front set of friction surfaces 12—12—12 of the casing and sliding the same inwardly thereon against the resistance of the inner coil spring E. Relatively light frictional resistance is thus provided during the first part of the compression stroke of the mechanism. During continued inward movement of the wedge B and the shoes C—C—C, the inner ends of the shoes approach and engage the rear set of shoes D—D—D. Contact of the wedge faces 18—18—18 of the shoes C—C—C with the wedge faces 21—21—21 of the shoes D—D—D causes the shoes D—D—D to be pushed backwardly or inwardly of the casing while the shoes C—C—C are being pushed inwardly, resisted by the spring F. In being thus moved inwardly, both sets of shoes are forced radially inwardly toward the longitudinal axis of the casing, due to the converging relation of the friction surfaces of each set 12—12—12 and 13—13—13. The shoes C—C—C are thus squeezed out rearwardly between the surfaces 12—12—12 of the casing and the wedge faces of the block B, and the shoes D—D—D are squeezed out rearwardly between the friction surfaces 13—13—13 of the casing and the wedge faces 18—18—18 of the shoes C—C—C. Inasmuch as the shoes D—D—D travel a greater distance rearwardly of the mechanism than the shoes C—C—C, due to the wedge faces 18—18—18 presenting a keener angle than the wedge faces of the block B, engagement between the wedge faces 18—18—18 and the shoes D—D—D is assured, even though the shoes C—C—C continue to travel inwardly on the friction surfaces of the casing, the wedge block B and the shoes C—C—C acting substantially in the manner of a single wedge element, even though there is slight inward slipping movement of the shoes C—C—C on the wedge faces of the block B. The wedging action set up between the wedge faces 18—18—18 of the front shoes C—C—C and the wedge faces 21—21—21 of the rear shoes D—D—D, effects spreading of the latter apart, thus forcing the same into tight frictional engagement with the rear set of friction surfaces 13—13—13 while the same are being pushed inwardly or rearwardly on said friction surfaces against the resistance of the outer coil spring F. The frictional resistance provided by the shoes D—D—D is thus added to that provided by the shoes C—C—C during the last part of the compression stroke of the mechanism, thereby greatly increasing the total frictional resistance to take care of heavier shocks encountered in service. When the actuating force is removed, the expansive action of the springs E and F returns all of the parts to the normal full release position shown in Figure 2, outward movement of the front set of shoes C—C—C being limited by the retainer bolt G, which restricts outward movement of the wedge B, and outward movement of the shoes D—D—D being limited by engagement with the shoulders 14—14—14 of the casing.

I claim:

1. In a friction shock absorbing mechanism, the combination with a friction casing having interior, longitudinally extending friction surfaces; of front and rear sets of friction shoes having sliding frictional engagement with said friction surfaces, said front set of shoes having direct wedging engagement with said rear set of shoes; a pressure transmitting wedge block in wedging engagement with said front set of shoes; and spring means within the casing yieldingly opposing inward movement of all of said shoes.

2. In a friction shock absorbing mechanism, the combination with a friction column member; of front and rear friction shoes in sliding frictional engagement with said column member, said front shoes having direct wedging engagement with said rear shoes; a pressure transmitting wedge block in wedging engagement with said front shoes; and spring means yieldingly opposing movement of said shoes inwardly of said column member.

3. In a friction shock absorbing mechanism, the combination with a friction column member; of a lengthwise extending friction surface on said column member; a second lengthwise extending friction surface on said column member rearwardly of said first named friction surface; a friction shoe in sliding frictional engagement with said first named surface; a second friction shoe in sliding engagement with said second named surface, said shoes having direct wedging engagement with each other; a wedge block in wedging engagement with said first named shoe; and spring means yieldingly opposing inward movement of said shoes.

4. In a friction shock absorbing mechanism, the combination with a friction column member; of a front set of lengthwise extending friction surfaces on said member; a rear set of lengthwise extending friction surfaces on said member; front and rear sets of friction shoes, said sets having sliding engagement respectively with the front and rear sets of friction surfaces of said member, the shoes of said front set having direct wedging engagement with the shoes of said rear set; a wedge block in wedging engagement with said front set of shoes; and spring means yieldingly resisting movement of said two sets of shoes inwardly of said member.

5. In a friction shock absorbing mechanism, the combination with a friction casing having interior friction surfaces; of front and rear friction shoes in sliding engagement with said friction surfaces, said shoes having direct wedging engagement with each other; a pressure transmitting wedge block in wedging engagement with said front shoes; and spring means yieldingly opposing movement of said front and rear shoes inwardly of the casing.

6. In a friction shock absorbing mechanism, the combination with a friction casing; of an interior friction surface on said casing; a second interior friction surface on said casing rearwardly of said first named surface; a friction shoe in sliding frictional engagement with said first named surface; a second friction shoe in sliding engagement with said second named surface, said shoes having direct wedging engagement with each other; a wedge block in wedging engagement with said first named shoe; and spring means yieldingly opposing inward movement of said shoes.

7. In a friction shock absorbing mechanism, the combination with a friction casing having front and rear sets of interior friction surfaces; of front and rear sets of friction shoes, said shoes of said front and rear sets having sliding engagement respectively with the front and rear sets of friction surfaces, the shoes of said front set having direct wedging engagement with the shoes of said rear set; a wedge block in wedging engagement with the shoes of said front set; and spring means yieldingly resisting movement of said two sets of shoes inwardly of the casing.

8. In a friction shock absorbing mechanism, the combination with a friction casing having interior, longitudinally extending friction surfaces; of front and rear sets of friction shoes having sliding frictional engagement with said friction surfaces, said shoes of said front and rear sets having cooperating wedge faces; means for limiting outward movement of said shoes of the rear set to hold the latter in position with the wedge faces thereof spaced inwardly from the wedge faces of the shoes of the front set in the normal full release position of the parts of the mechanism; a pressure transmitting wedge block in wedging engagement with said front set of shoes; and spring means within the casing yieldingly opposing inward movement of all of said shoes.

9. In a friction shock absorbing mechanism, the combination with a friction casing having interior, longitudinally extending friction surfaces; of front and rear sets of friction shoes having sliding frictional engagement with said friction surfaces, said shoes of said front and rear sets having cooperating wedge faces; means for limiting outward movement of said shoes of the rear set to hold the latter in position with the wedge faces thereof spaced inwardly from the wedge faces of the shoes of the front set in the normal full release position of the parts of the mechanism; a pressure transmitting wedge block in wedging engagement with said front set of shoes; a spring means opposing inward movement of said front set of shoes; and a second spring means opposing inward movement of said rear set of shoes independently of said first named spring means and shoes.

10. In a friction shock absorbing mechanism, the combination with a friction column member; of front and rear friction shoes in sliding frictional engagement with said column member, said shoes having cooperating wedge faces; means for limiting outward movement of the rear shoe to hold the latter in position with its wedge face spaced inwardly from the cooperating wedge face of the front shoe in the normal full release position of the parts of the mechanism; a pressure transmitting wedge block in wedging engagement with said front shoes; and spring means yieldingly opposing movement of said shoes inwardly of said column member.

11. In a friction shock absorbing mechanism, the combination with a friction column member; of front and rear friction shoes in sliding frictional engagement with said column member, said shoes having cooperating wedge faces; means for limiting outward movement of the rear shoe to hold the latter in position with its wedge face spaced inwardly from the cooperating wedge face of the front shoe in the normal full release position of the parts of the mechanism; a pressure transmitting wedge block in wedging engagement with said front shoe; a spring means opposing inward movement of said front shoe; and a second spring means opposing inward movement of said rear shoe independently of said first named spring means and front shoe.

12. In a friction shock absorbing mechanism, the combination with a friction column member; of a lengthwise extending friction surface on said column member; a second lengthwise extending friction surface on said column member rearwardly of said first named friction surface; a friction shoe in sliding frictional engagement with said first named surface; a second friction shoe in sliding engagement with said second named surface, said shoes having cooperating wedge faces; means for limiting outward movement of the rear shoe to hold the latter in position with its wedge face spaced inwardly from the cooperating wedge face of the front shoe in the normal full release position of the parts of the mechanism; a wedge block in wedging engagement with said first named shoe; and spring means yieldingly opposing inward movement of said shoes.

13. In a friction shock absorbing mechanism, the combination with a friction column member; of a lengthwise extending friction surface on said column member; a second lengthwise extending friction surface on said column member rearwardly of said first named friction surface; a friction shoe in sliding frictional engagement with said first named surface; a second friction shoe in sliding engagement with said second named surface, said shoes having co-operating wedge faces; means for limiting outward movement of the second named shoe to hold the latter in position with its wedge face spaced inwardly from the cooperating wedge face of the first named shoe in the normal full release position of the parts of the mechanism; a wedge block in wedging engagement with said first named shoe; a spring means opposing inward movement of said first named shoe; and a second spring means opposing inward movement of said second named shoe independently of said first named spring means and first named shoe.

14. In a friction shock absorbing mechanism, the combination with a friction column member; of a front set of lengthwise extending friction surfaces on said member; a rear set of lengthwise extending friction surfaces on said member; front and rear sets of friction shoes, said sets having sliding engagement respectively with the front and rear sets of friction surfaces of said member, said shoes of said front and rear sets having cooperating wedge faces; means for limiting outward movement of said shoes of the rear set to hold the latter in position with the wedge faces thereof spaced inwardly from the wedge faces of the shoes of the front set in the normal full release position of the parts of the mechanism; a wedge block in wedging engagement with said front set of shoes; a spring means opposing inward movement of said front set of shoes; and a second spring means opposing inward movement of said rear set of shoes independently of said first named spring means and front set of shoes.

15. In a friction shock absorbing mechanism, the combination with a friction column member; of a front set of lengthwise extending friction surfaces on said member; a rear set of lengthwise extending friction surfaces on said member; front and rear sets of friction shoes, said sets having sliding engagement respectively with the front and rear sets of friction surfaces of said member, said shoes of said front and rear sets having cooperating wedge faces; means for limiting outward movement of said shoes of the rear set to hold the latter in position with the wedge faces thereof spaced inwardly from the wedge faces of the shoes of the front set in the normal full release position of the parts of the mechanism; a wedge block in wedging engagement with said front set of shoes; and spring means yieldingly resisting movement of said two sets of shoes inwardly of said member.

16. In a friction shock absorbing mechanism, the combination with a friction casing having interior friction surfaces; of front and rear friction shoes in sliding engagement with said friction surfaces, said front shoes having wedge faces at their inner ends, and said rear shoes having wedge faces at their front ends engageable by said wedge faces of the front shoes; stop means on said casing with which said rear shoes are engageable in full release position of the parts of the mechanism for holding said rear shoes with the wedge faces thereof spaced inwardly from the wedge faces of the front shoes; a pressure transmitting wedge block in wedging engagement with said front shoes; and spring means yieldingly opposing movement of said front and rear shoes inwardly of the casing.

17. In a friction shock absorbing mechanism, the combination with a friction casing having interior friction surfaces; of front and rear friction shoes in sliding engagement with said friction surfaces, said front shoes having wedge faces at their inner ends, and said rear shoes having wedge faces at their front ends engageable by said wedge faces of the front shoes; stop means on said casing with which said rear shoes are engageable in full release position of the parts of the mechanism for holding said rear shoes with the wedge faces thereof spaced inwardly from the wedge faces of the front shoes; a pressure transmitting wedge block in wedging engagement with said front shoes; spring means yieldingly opposing movement of said front shoes inwardly of the casing; and additional spring means yieldingly opposing movement of said rear shoes inwardly of the casing independently of said first named spring means and front shoes.

18. In a friction shock absorbing mechanism, the combination with a column member having longitudinally disposed friction surfaces; of front and rear friction shoes having friction surfaces engaging said column friction surfaces, said front shoes having wedge faces at their front and rear ends, and the rear shoes having wedge faces at their front ends; a wedge block having wedge faces in constant engagement with the front wedge faces of said front shoes, the rear shoes having the wedge faces thereof normally spaced from the rear wedge faces of said front shoes and adapted to be engaged by said last named wedge faces after the mechanism has been compressed to a predetermined extent, thereby effecting successive operation of said front and rear shoes; and spring resistance means yieldingly opposing relative movement of said front and rear shoes inwardly with respect to said column element.

19. In a friction shock absorbing mechanism, the combination with a column element having longitudinally extending friction surfaces; of front and rear sets of shoes having friction surfaces engaging said column friction surfaces; a wedge block movable inwardly with respect to said column element, said wedge block having wedging engagement with said front set of shoes during the entire compression stroke of the mechanism; a wedge projection on said front shoes having wedging engagement with said rear shoes after the mechanism has been compressed to a pretermined extent to add the frictional resistance of the rear shoes to that of the front shoes; and yielding means opposing movement of said front and rear shoes inwardly of said column element.

GEORGE E. DATH.

REFERENCES CITED

The following references are of record in the file of this patent:

UNITED STATES PATENTS

| Number | Name | Date |
|---|---|---|
| 1,041,862 | O'Connor | Oct. 22, 1912 |
| 1,169,434 | Sherman | Jan. 25, 1916 |
| 1,169,435 | Sherman | Jan. 25, 1916 |
| 1,202,907 | Sherman | Oct. 31, 1916 |
| 1,403,617 | Moore | Jan. 17, 1922 |
| 1,616,756 | O'Connor | Feb. 8, 1927 |